May 27, 1952     H. J. KAMMANDEL     2,597,998
AIRPLANE PROPELLER Filed April 20, 1948     9 Sheets-Sheet 1

INVENTOR.
HEINZ JOSEF KAMMANDEL
BY
Warren S. Orton.
ATTORNEY

May 27, 1952 H. J. KAMMANDEL 2,597,998
AIRPLANE PROPELLER
Filed April 20, 1948 9 Sheets-Sheet 2

INVENTOR.
HEINZ JOSEF KAMMANDEL
BY Warren S. Orton
ATTORNEY

May 27, 1952  H. J. KAMMANDEL  2,597,998
AIRPLANE PROPELLER
Filed April 20, 1948  9 Sheets-Sheet 4

INVENTOR.
HEINZ JOSEF KAMMANDEL
BY
Warren S. Orton
ATTORNEY

May 27, 1952     H. J. KAMMANDEL     2,597,998
AIRPLANE PROPELLER

Filed April 20, 1948     9 Sheets-Sheet 6

INVENTOR.
HEINZ JOSEF KAMMANDEL
BY Warren S. Orton
ATTORNEY

May 27, 1952   H. J. KAMMANDEL   2,597,998
AIRPLANE PROPELLER

Filed April 20, 1948   9 Sheets-Sheet 8

INVENTOR.
HEINZ JOSEF KAMMANDEL
BY
Warren S. Ostow
ATTORNEY

INVENTOR.
HEINZ JOSEF KAMMANDEL

Patented May 27, 1952

2,597,998

UNITED STATES PATENT OFFICE 2,597,998

AIRPLANE PROPELLER

Heinz Josef Kammandel, Woodside, N. Y.

Application April 20, 1948, Serial No. 22,132

25 Claims. (Cl. 170—135.21)

The invention relates in general to an aeroplane construction and specifically relates to an aeroplane propeller.

The primary object of the invention is to provide an aeroplane propeller which will function wtih greater efficiency than do aeroplane propellers now in general use.

Aeroplane propellers now in general use are of the bladed screw type and possess numerous disadvantages among which may be mentioned that they have a relatively low efficiency as there is only a small portion of the rotating mass capable of doing effective work in producing a propulsion of the aeroplane. The portion of these screw propellers adjacent their centers must be made massive in order to provide the necessary structural strength to the propeller as a whole and yet this center mass is rotating too slow to contribute any material propelling action. This mass not only uses up engine force to keep it rotating but actually retards the areoplane travel as it offers air resistance. On the other hand the extreme outer ends of such propeller blades have to be made thin and are disposed at such a small angle to the direction of their thrust that the outer portion of the propeller can contribute to only a small part of the vehicle propelling action. This means that only about one-third of the total mass of the screw propeller is effective as a propeller. Further with screw propellers there is a structural limit to the possible radial diameter and this means that there is a limit to the area of the working portion which screws through the air.

The invention herein features a form of propeller in which the work surfaces engaging the air are spaced a material distance from the axis of rotation of the propeller to obtain long torque arms and thus increased fly-wheel effect and at the same time to provide for greatly enlarged areas to the work surfaces and thus provide a greater efficiency in propulsion than has been possible heretofore. Further slow rotating center masses have been minimized and the necessary connection between the hub of the propeller and the work surfaces have been skeletonized, minimized and even stream-lined.

Another object of the invention is to provide an aeroplane propeller capable of utilizing the forward momentum of the aeroplane itself independent of the power plant to provide a self-acting weight supporting or even a weight lifting factor thereby to assist the aeroplane to a long gliding action and even to an ascending movement.

Another object of the invention is to provide a propeller which while being turned by the force from the associated power plant will possess a lift-thrust action and which will thus tend to assist the aeroplane in climbing faster, that is with a greater angle of elevation than is possible with the present aeroplane constructions, and which will also permit with safety a sharper angle of drop, that is a greater angle of declination, than is possible with known constructions and at the same time to provide an aeroplane propeller which will contribute to the safety of operation of the aeroplane.

Another disadvantage of known forms of screw propellers, especially when rotating at their high speeds, is that they create an air turbulency with its incidental variations in air densities and a blade is very apt to turn into a vacuous space created by the preceding blade with but little resulting propelling effect.

The present disclosure contemplates a relatively slow propeller speed with incidental economy in operation over high speed mechanism and the providing of a propelling action which insures the operating of the propelling blades or aerofoils in fresh, undisturbed air and free or substantially free from mutual interference.

Still another object of the invention is to provide a form of propeller which will localize large areas of main work surfaces remote from the axis of rotation to obtain the desired fly-wheel effect above recited and also to utilize the necessary connecting structure to provide a screw effect to assist in the effectiveness of the thrust factor of the propeller attributable to the main work surfaces.

The invention features other desirable characteristics such, for instance, as the minimizing of frontal air resistance of the several parts of the propeller which do not have the screw effect; the providing of a propeller which will tend to minimize eccentrict centrifugal effects and the providing of a structure which will tend to counterbalance strains which might otherwise become destructive at high speeds.

Various other objects and advantages of the invention will be in part obvious from an inspection of the accompanying drawings and in part will be more fully set forth in the following particular description of one form of mechanism embodying the invention, and the invention also consists in certain new and novel features of construction and combination of parts hereinafter set forth and claimed.

In the accompanying drawings:

Fig. 7 is an enlarged plan view looking down on the showing in Figs. 3 and 4 and illustrating the parts with the aerofoil controlling cam in operative position for controlling the rocking of the aerofoils when the aeroplane is in flight.

Figs. 8 and 9 are enlarged detail views of the structure at the outer ends of the spokes with the cam and associated mechanism shown in the position indicated therefor in Fig. 7; Fig. 8 being a sectional view taken axially through the horizontal aerofoil drive shaft and Fig. 9 being a view in side elevation at right angles to the showing in Fig. 7 and with the aerofoil removed;

Figs. 11 and 12 are details of the aerofoil shaft mounting shown in Fig. 10; Fig. 11 being a transverse view taken on the line 11—11 of Fig. 10 looking in the direction indicated by the arrows and Fig. 12 being a view looking at Fig. 10 from the right hand side and with parts of the spring holding ears broken away;

Figs. 16 to 18, inclusive, are diagrammatic charts showing the successive positions of any one of the aerofoils during their cycle of rotary movement; Fig. 16 showing the succeeding positions of the aerofoil at the start of operation; Fig. 17 showing the relation of the aerofoils when in normal forward flight; and Fig. 18 showing their position when gliding.

Figures 1, 2, 3:
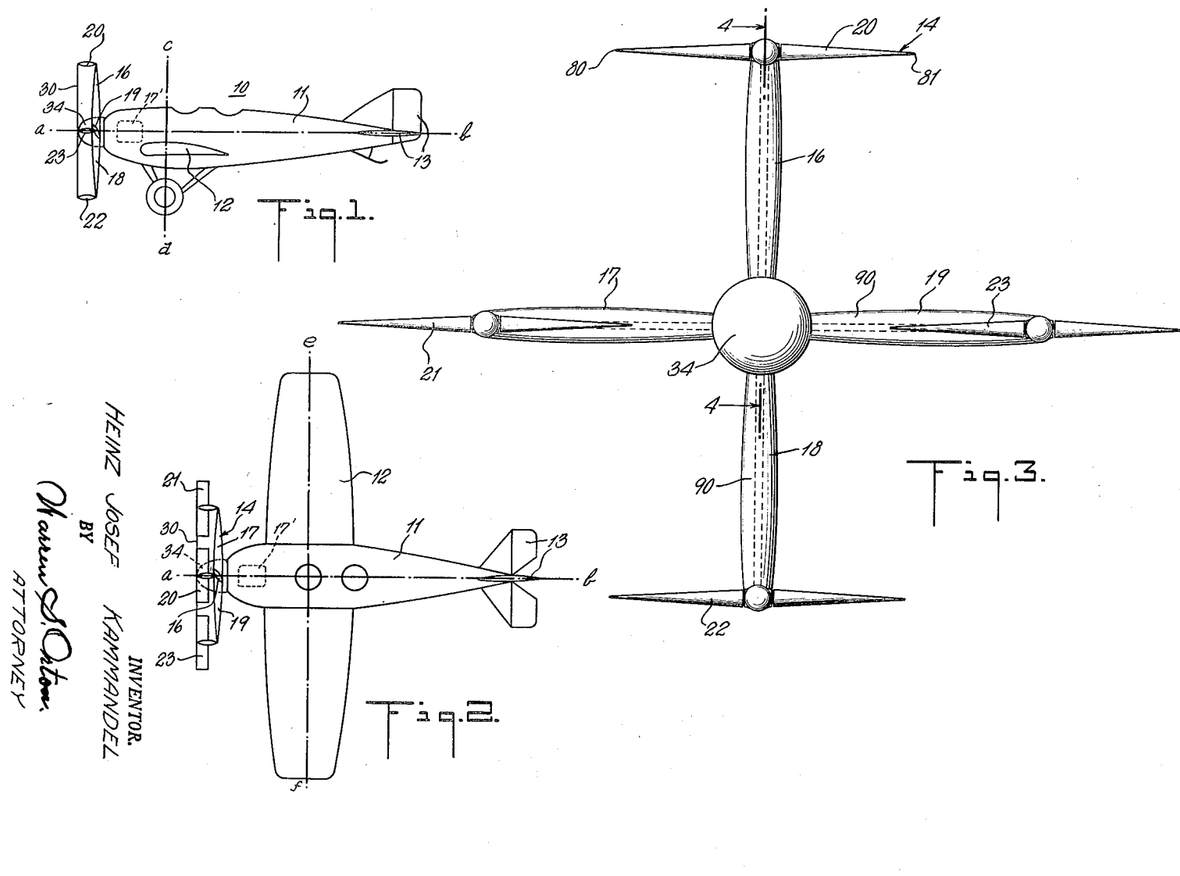
Figs. 1 and 2 are respectively views in side elevation and in plan of a conventional form of aeroplane provided with a propeller constituting a preferred physical embodiment of the invention.
Fig. 3 is an enlarged view in front elevation of the propeller shown in Figs. 1 and 2 with the parts shown in normal position when the aeroplane is at rest.
Figure 2:
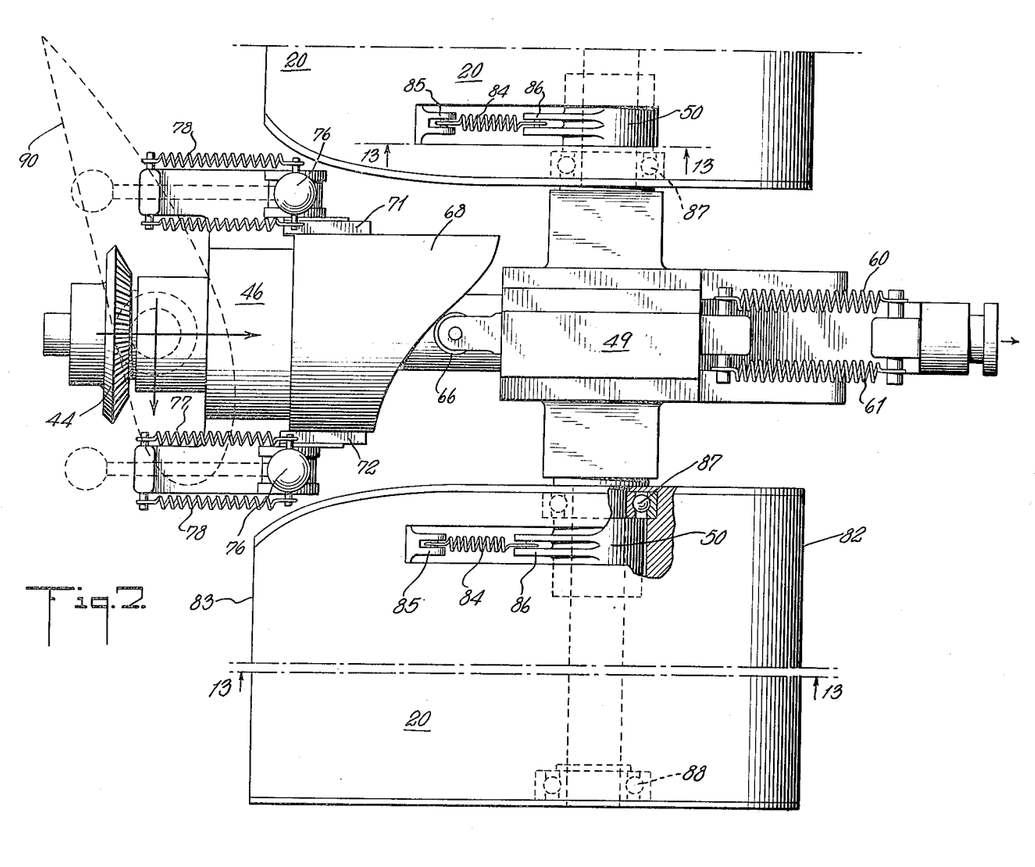

Referring to the drawings and particularly to Figs. 1 and 2, there is disclosed an aeroplane 10 of conventional design including fuselage 11, supporting planes 12 and guiding rudders 13 and provided at its forward end with a propeller 14 constituting the novel element of this disclosure. The lines $a$—$b$ indicate the longitudinal axis, sometimes hereinafter referred to as the normal line of flight or axis of rotation of the propeller. The broken line $c$—$d$ indicates the vertical axis and $e$—$f$ indicates the lateral axis. In general it is to be understood that the showing in Figs. 1 and 2 is intended to show the application of the invention to any form of aeroplane and it is obviously possible to utilize propellers of the type herein disclosed in balanced pairs on opposite sides of the vertical longitudinal medial plane $a$—$b$. While an aeroplane has been particularly selected for illustration in showing the applicability of the invention to a mechanically propelled vehicle, it will be understood that the propeller is of general application to any self-propelled body in flight and may, with obvious necessary changes, be adapted to marine vehicles.

The propeller is of a rimless, wheel-like, or cross construction with the center of rotation at the center of the cross. The propeller includes a hub 15 (see Fig. 4) mounted on the power or drive shaft 16' of a prime mover, such as an engine 17' positioned within the fuselage 11 and following conventional practices in this respect. Radiating from the hub 15 are four spokes or cross arms 16, 17, 18 and 19 (see Fig. 3) disposed in diametrically opposite pairs and provided respectively at their outer ends with aerofoils 20, 21, 22 and 23. The aerofoils extend lengthwise across the line of flight and are equidistantly spaced apart circumferentially. The aerofoils are designed so as to have an extensive work surface and for this reason are made relatively long compared to the diameter of the air surfaces engaged by the propeller as it rotates as noted in Figs. 3 and 15. The aerofoils have a length in the illustrated showing greater than the diameter of the circle $g$ described by their centers of pressure and are of a length sufficiently short to permit the aerofoils to pass each other without interference and to pass the hub structure with sufficient clearance between the adjacent edges of the aerofoils and the hub to avoid the forming of mutually interfering air turbulency. The inner rugged part of the diametrically extending spokes are each of one piece and beyond the hub forming portion are of the combined channel and fin construction shown in full lines in cross section at 24 in Fig. 14. The central portion of these spoke forming channel lengths are flat rectangular plates.

Figures 4, 5, 6:
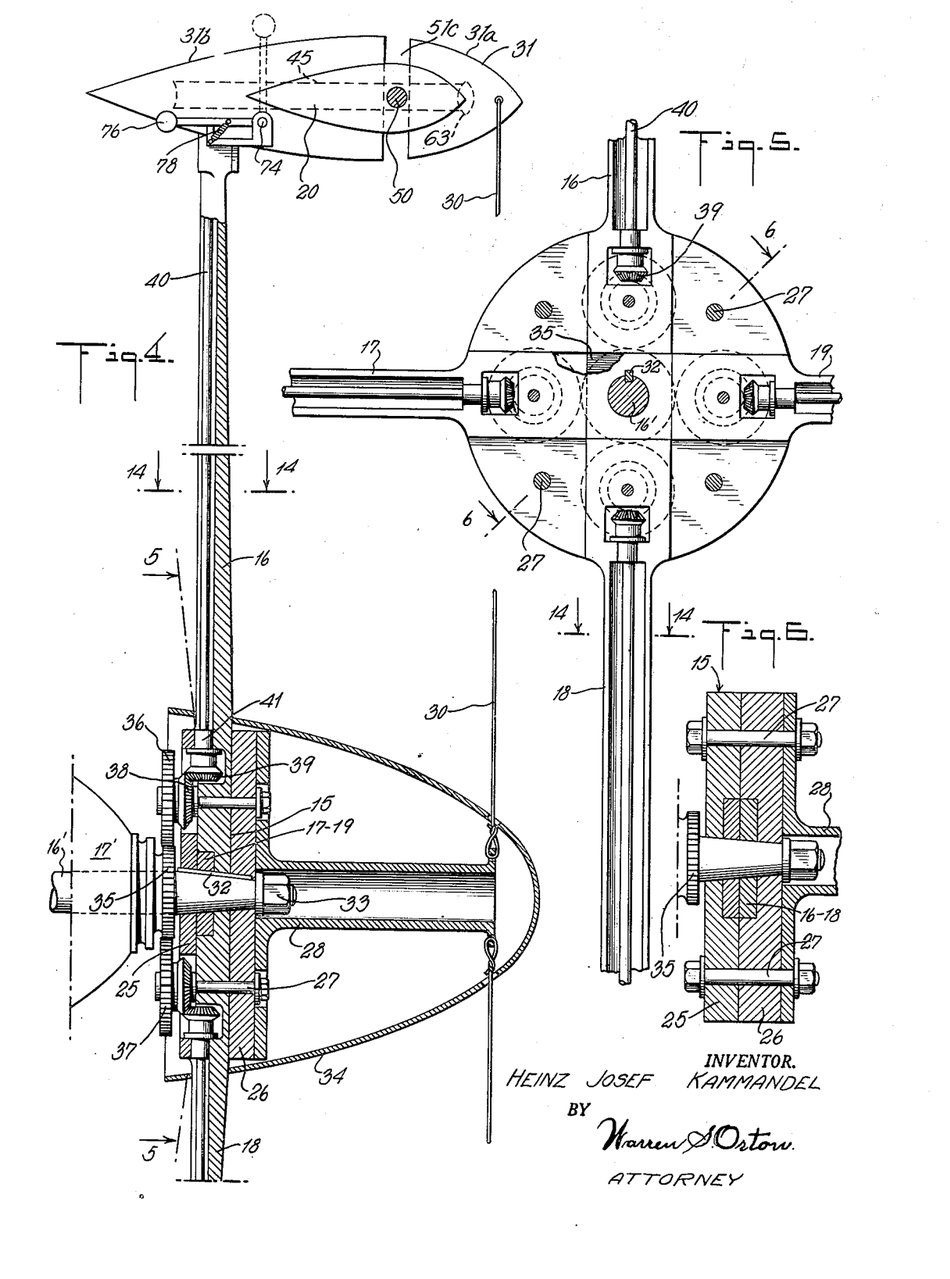
Fig. 4 is a vertical sectional view taken through the hub and upstanding spoke and associated aerofoil with the streamlined casing of the spoke omitted, and taken on the line 4—4 of Fig. 3.
Fig. 5 is a view partly in elevation of the hub portion of the propeller with parts broken away and parts shown in section take on the line 5—5 of Fig. 4 looking in the direction indicated by the arrows.
Fig. 6 is a detailed view taken axially through the hub and taken on the line 6—6 of Fig. 5, looking in the direction indicated by the arrow.

The hub 15 as a whole is formed of the intersecting flat plates, each plate being half reduced in thickness at the intersection to provide a dovetail fit tending to resist rotational separation of the spokes as shown in Figs. 4, 5 and 6. The spoke forming bars are firmly secured between a pair of clamping plates 25 and 26 secured together with the spokes therebetween by through bolts 27. A flanged tubular member 28 is secured to the forward end of the hub and serves to secure a cable 30 for anchoring the nose piece of the cam mechanism enclosing casing 31 hereinafter described from strain due to centrifugal action of the revolving propeller. The propeller is keyed conventionally to the engine shaft 16 by means of splines 32 and is secured firmly in place by nut 33 accessible through the open end of the tube 28. The hub is enclosed within a forwardly pointing stream-lined conical nose casing 34.

As the propeller is rotated as a whole by the rotation of the engine shaft the several aerofoils are caused to have a rotating movement relative to the part of the propeller in which they are journalled and about a self-contained axis and for this purpose the aerofoils are in turn connected so as to be moved by the engine incidental to the rotation of the propeller in such way that their respective span axes are always horizontal. For this purpose, a stationary gear 35 (see Fig. 4) is secured to the engine casing concentric with the shaft 16. Gear 35 constitutes the middle element of four planetary gear trains, one for each of the spokes; gear 36 for spoke 16 and gear 37 for spoke 18 being shown in Fig. 4. It will be understood, of course, that as the propeller rotates it carries with it the four revolving gears corresponding to gears 36 and 37 and their associated mechanism. As this mechanism is the same for each of the spokes, it is believed that a detailed description of any one, such, for instance, as the mechanism associated with the spoke 16, will be sufficient description for the other three spokes and associated parts.

Figure 11:
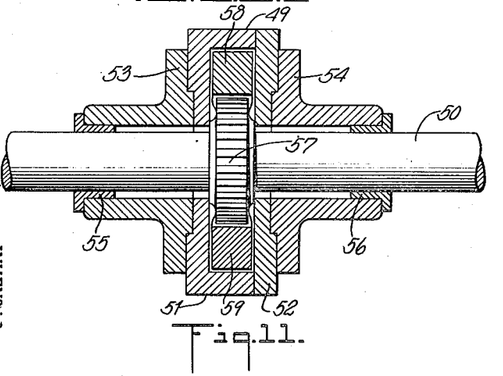
Figure 12:
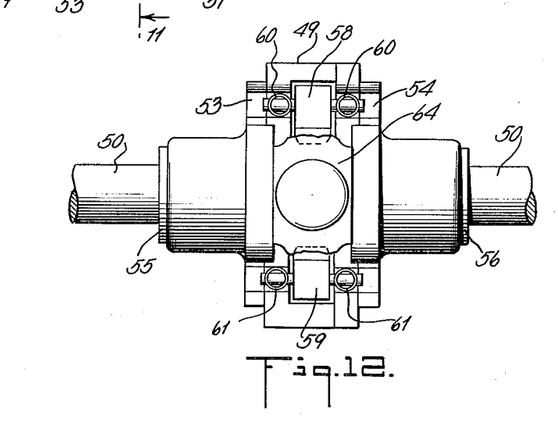

Rigid with the gear 36 is a bevel gear 38 which in turn meshes with a bevel gear 39 secured at the inner end of a radial main or spoke shaft 40 journalled at opposite ends in the spoke 16 as by means of the bearings shown at 41 and 42. A bevel gear 43 (see Fig. 8) is secured to the outer end of the shaft 40 and this in turn meshes with a bevel gear 44 secured to an end of a horizontal auxiliary shaft 45 in turn mounted in a bracket 46 secured to and forming a lateral extension from the outer end of the spoke 16. The shaft 45 is mounted in bearings 47, 48, carried by a tubular portion of the bracket 46. The end of the auxiliary shaft 45 opposite the end provided with the gear 44 is secured to an enlarged box-like casing 49 in which is journalled the aerofoil shaft 50. From Fig. 11 it will be noted that the casing 49 is formed of an open side box 51 with the open side closed by a plate 52 and the parts held together by a pair of hub-like flanged members 53 and 54, mounting sleeves 55 and 56 being positioned between the shaft 50 and the members 53 and 54 respectively. Within the casing 49 the shaft 50 is provided with a pinion 57 which is engaged on opposite sides by a pair of racks 58 and 59 guided in the casing 49 for longitudinal movement lengthwise of the shaft 45. The racks are normally biased with a tendency to move to the right in the showing in the several figures by means of springs 60 and 61 which are secured at one end to their respective racks and at the opposite end to ears 62 and 63 projecting laterally from a T extension 64 from the casing 49. The opposite ends of the racks 58 and 59 are provided respectively with rollers 65 and 66 and which in turn are designed to be engaged by the cam surface 67 of a crown shaped barrel type cam 68 slidably mounted on splines 69 formed on the outside of the cylindrical part 70 of the bracket 46.

The cam is designed to be controlled by the rotary speed of the propeller and for this purpose is provided on opposite sides with a pair of racks 71 and 72 in mesh respectively with centrifugally controlled segments, one of which is shown at 73 mounted on shaft 74 carried by projections 75 forming part of the bracket 46. Shaft 74 is rotated by means of a ball governor 76 of the weighted ball end type and which is held normally in position to maintain the cam out of operative engagement with the rollers 65 and 66 by means of a pair of springs 77 and 78. It will be understood that the tension of these springs 77 and 78 may be adjusted so as to maintain the cam 68 in its inoperative position shown in Fig. 10 until such time as the propeller reaches that preselected speed at which it is desired to bring the cam into control of the rocking motion of the aerofoils. The aerofoils have been considered each as a single unit as they will usually function as such but each aerofoil is actually formed of a central portion represented by the stream-line casing 31 and a pair of half aerofoils or blades, each half or blade positioned on opposite sides of the casing 49 as particularly shown in Fig. 7. As these halves or blades are of similar construction the detailed description of either one will be sufficient for its companion. The aerofoils considered as a whole are of maximum depth at their centers as indicated at Fig. 3 and gradually reduce therefrom to sharp end edges 80 and 81 and which may be considered respectively as trailing edges.

Figures 13, 14, 15:
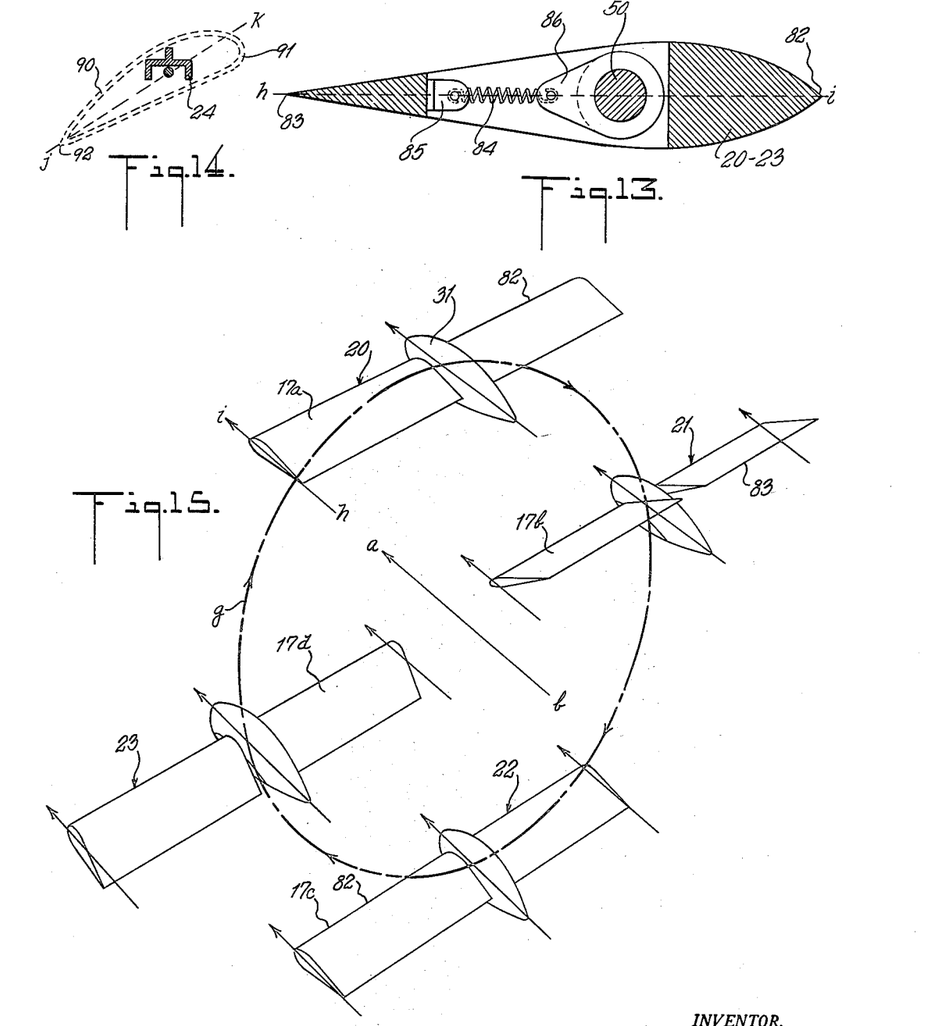
Fig. 13 is an enlarged transverse sectional view through one of the aerofoils taken on the line 13—13 of Fig. 7.
Fig. 14 is a detailed transverse sectional view taken through one of the spokes of the propeller and taken on the line 14—14 of Fig. 4 and 5.
Fig. 15 is an explanatory view showing the relative positions of the aerofoils when viewed in perspective and while the aeroplane is in normal flight.

Considered in transverse section as in Fig. 13, the aerofoil is of conventional design having a symmetrical section relative to a plane of reference indicated by the major axis $h$—$i$ and midway therebetween with a relatively blunt leading edge 82 and the gradually tapered off rear edge 83. Each blade has its lengthwise span materially greater, several times greater, than its chord measured in the direction of the line of flight. The aerofoil is mounted on its shaft 50 with the shaft disposed nearer the leading edge than the trailing edge or in advance of the center of pressures and in the instant case positioned $10/27$ of the major axis $h$—$i$ from the leading edge. The greater areas of both the upper and lower surfaces exposed to beat the air, that is, the surfaces between the rocking axis at 50 and the trailing edge 83, are substantially flat and form a small angle, about sixteen degrees, with the axis $h$—$i$ as shown in Fig. 13. The aerofoil is almost but not rigidly secured to the shaft 50. The aerofoil is actually loose on the shaft but is held in a substantially rigid relation by means of a spring 84 which extends in the longitudinal major axis of the aerofoil as shown in Fig. 13, with one end secured by means of lugs 85 to the aerofoil adjacent its trailing edge and the other end secured between a pair of lever arms 86 secured to the shaft 50 adjacent the casing 49 as shown in Fig. 7. The springs 84 are under a greater tension than the rock bar retreating springs 60 and 61 for reasons hereinafter explained but are under a tension insufficient to resist the unbalancing air pressures on the aerofoils when the aeroplane is in full flight. The shaft 50 is mounted in anti-friction devices 87 and 88 (see Fig. 7) so as to minimize frictional resistance between relative rotary movement between the shaft 50 and the aerofoil.

All parts are stream-lined so far as possible, it being particularly noted that the rugged part of the spokes hereinbefore described are enclosed with a casing 90 as indicated in dotted lines in Figs. 7 and 14. The stream-line forming shell 90 is semi-heart shape in cross section with a leading edge 91 and a trailing edge 92 and with its axis $j$—$k$ inclined to the plane of rotation of the propeller to form of the spokes a screwlike propeller which simulates the conventional blade propeller and assists in the forward thrust effect of the propeller rods which is necessary to carry the large aerofoil and associated cam mechanism is not only streamlined to minimize frontal resistance but these necessary parts are actually utilized to provide an auxiliary propeller effect. The hub portion is contained within the stream line or conical casing 34 and the cam and associated parts at the outer ends of the spokes are enclosed within the streamlined casing or shell 31. The casing 31 is formed of two coaxially aligned parts, a nose piece 31a and a tail end 31b, separated by a space 51c containing aerofoil shaft 50. The nose piece is firmly attached to ears 62 and 63 at the forward end of shaft 45 (see Figs. 8, 9) and, therefore, remains with the shaft 50 fixed at all times in a horizontal position. The tail piece 31b is connected to the spokes 16 and contains cam 68 and adjacent parts shown to the left of Fig. 7.

Figure 10:
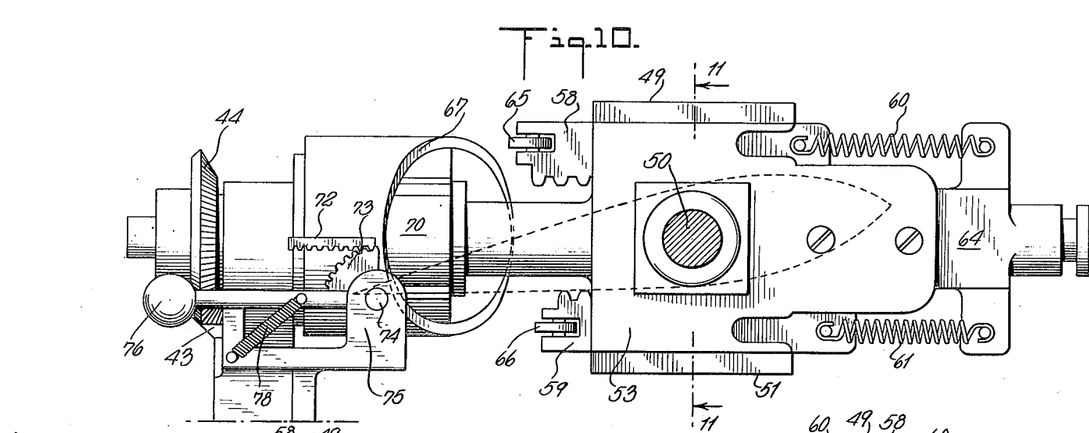
Fig. 10 is a view similar to Fig. 9 showing the cam in its normal inoperative position as when the aeroplane is either at rest or moving at low speed.

In operation and before the motor rotates the propeller, it will be understood that all the aerofoils are in the normal, inoperative horizontally-extending position shown in full lines in Fig. 3 and with the cam in its inoperative retracted position shown in Fig. 10. The springs 60 and 61 have operated to restore the shaft 50 to its normal position if not already in this position. As soon as the propeller is coupled to the motor it will begin to rotate, anti-clockwise when viewed from the front of the aeroplane as indicated by the arrows in Fig. 22. It will be noted that the propeller as a whole rotates in a plane perpendicular to, or at right angles to the line of flight indicated by the longitudinal axis a—b in Fig. 1. It will be thus seen that as the aeroplane itself moves forwardly the aerofoils are moving bodily not only in the forward direction of the aeroplane movement but are moving as part of the rotating propeller in a plane at right angles to this direction. Considering the central point or lateral center of pressure of each aerofoil it will be seen that such point in each of the aerofoils moves in the plane about a circle of reference g, Fig. 15, so that the centers of pressures of all the aerofoils are maintained in a plane perpendicular to the line of movement. As the propeller rotates about its axis to revolve the auxiliary shaft 45 it also acts to rotate this shaft 45 through the agency of the planetary gear train and its associated parts. For instance, gear 36 rolls about the stationary gear 35, this, in turn, rotates the shafts 49 and 45 relative to the parts which carry the same, that is relative to the propeller. As shaft 45 rotates about its own axis it also rotates the casing 49 and the parts carried thereby. The parts are so proportioned that with each unit of angular turn of the propeller as a whole the casing 49, and with it the associated parts including the aerofoils, are rotated in the opposite direction although with equal angular turn with the result that the aerofoils are at all times maintained in their initial horizontal position in space insofar as the action of this mechanism is concerned.

At the beginning of the forward movement of the aeroplane it is appreciated that the resistance to frontal movement is relatively small compared with this resistance when in full flight so that in the early stages of forward movement the frontal resistance is relatively negligible and practically the entire engine torque is being utilized in rotating the propeller as if in still air. During this period it will be noted by reference to Fig. 15 that the aerofoils which happen to be at the top and bottom, that is at the twelve and six o'clock positions on the circle of reference are moving horizontally with their lateral edges 82 in advance. At and near these extreme top and bottom positions the air pressures on top and bottom work surfaces of the aerofoils are equal, or almost so, and therefore the aerofoil maintains its substantial horizontal position. As each aerofoil moves from its twelve o'clock through its nine o'clock position and down towards its six o'clock position, it is, of course, meeting reactory air pressure on its underside, and this has the effect due to the greater area in rear of the shaft 50 to cause the aerofoil to tilt about the axis of the shaft 50 with its leading edge 82 inclined downwardly and its trailing edge 83 elevated upwardly from the previous horizontal position. Considering this rocking movement of the descending aerofoil it will be appreciated that from its horizontal lay at the twelve o'clock position the aerofoil gradually approaches its maximum angle of declination at the nine o'clock position after which it gradually restores itself to the horizontal lay when it reaches the six o'clock position.

Considering the action of the aerofoils when moving upwardly from the six o'clock through the three o'clock towards the twelve o'clock position, the reverse action takes place. That is, as the aerofoil moves upwardly it is resisted by the air pressure on top of the aerofoil which lowers the rear or trailing edge and elevates its leading edge. Here again the angle of ascension passing from its zero value at the six o'clock position through its maximum value at the three o'clock position and back again to its zero or horizontal position at the twelve o'clock position, after which the cycle of operation is repeated.

Figure 16:
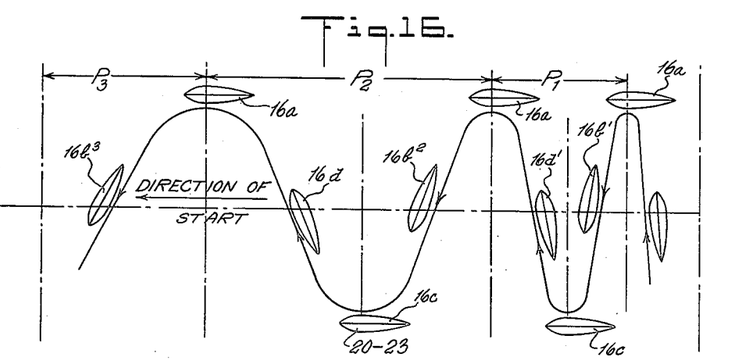

This change in position of the aerofoils during the initial few seconds of aeroplane travel is illustrated in Fig. 16 where three cycles or turns of rotation of the propeller are indicated successively by the spaces P1, P2 and P3, the length of these spaces being progressively greater to show increase in speed of the aeroplane during each of the succeeding units of time. It will be noted that in the first period P1, the aerofoils at the three and nine o'clock positions marked respectively 16b¹ and 16d¹ are sharply inclined to the vertical because at this time the aeroplane is substantially not moving and therefore any air resistance present which resist propeller movement are more or less vertical. But in the succeeding periods of propeller rotation, the aerofoils become less sharply inclined to the vertical and this disposition of the aerofoils to approach their horizontal position becomes greater as the aeroplane speed increases. It is noted for instance that aerofoil 16b² has shifted from the vertical slightly more than 16b¹ and 16b³ has still further approached the horizontal. It is understood, of course, that the action of the aerofoils in being turned from their horizontal position by virtue of air resistance during ascent and descent is resisted by the powerful springs 84 which act on the aerofoils to return them to their horizontal position when free of unbalancing air pressures as when in their twelve and six o'clock positions. During this initial period of operation the cam 68 is out of control and the aerofoils may assume any degree of angularity relative to their normal position which may be imposed upon them by the air resistant conditions present at any instant of time.

Figures 8, 9:
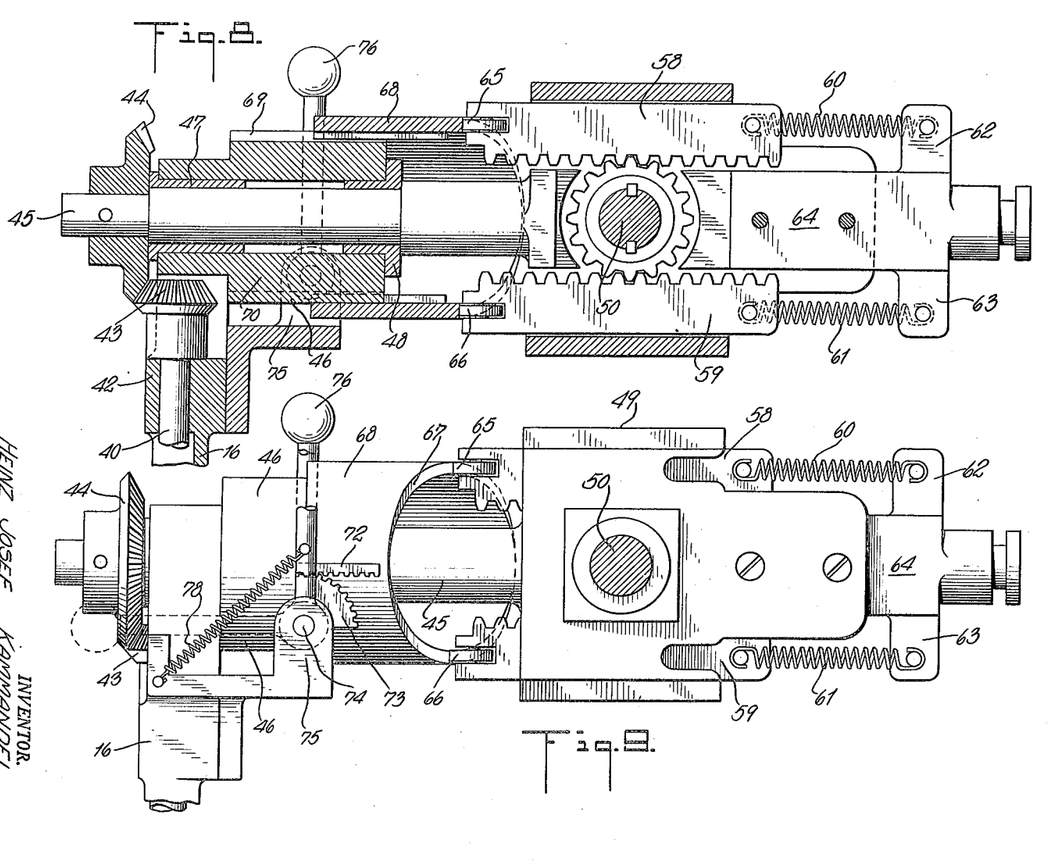

As the propeller increases in speed, the weighted levers 76 forming the governors fly outward due to the incidental centrifugal action and against the preset tension of the springs 77, 78 and act through the rack and segment connection 72, 73, to slide the cam 68 from the position shown in Fig. 10 into bearing engagement with the rollers 65 and 66 as shown in Figs. 7–9. The springs controlling the centrifugal governors are preset so that the cam will come into operation at some desired speed such, for instance, as a speed of one hundred miles per hour, at which time the aeroplane is regarded as being in full flight. With the cams in control of the aerofoils, the angular rocking movement of the aerofoils is not thereafter under control of the air pressures but the aerofoils are actually and positively moved into those exact and constantly repeated angular positions which have been predetermined to be the most effective balance between the force component necessary to give the desired lift effect on the aeroplane and the force component which is desired to give the thrust effect utilized to propel the vehicle. It will be noted that the cam surface 67 is so arranged that the high point on one side is opposite the low point on the other and the cam surface is so designed that as the cam rotates about its own axis it will simultaneously move one of the racks, say 58, in one direction and rack 59 in the opposite direction thus causing shaft 50 to rotate clockwise over a preset angle during one half of the cam rotation and to rotate counterclockwise during the other half of the cam rotation, the parts being so arranged that the aerofoils are horizontal at the twelve and six o'clock positions as previously described. This means that when the aeroplane is in flight the aerofoils are moved into preset and equal angular positions at their nine and three o'clock positions. It will be understood that increasing the angle of declination and the angle of ascension will increase the thrust component acting horizontally and thus increase the propulsion thrust on the aeroplane while decreasing these angles will increase the thrust component acting vertically and thus increase the lifting thrust on the aeroplane. The cam 68 must therefore be carefully designed for each aeroplane so as to obtain the maximum forward thrust and thus the greatest possible speed for each particular aeroplane.

The same principal of operation with its cam control as herein suggested for an aeroplane with its incidental high speed may also be employed for controlling relatively larger aerofoils in a propeller for use in a helicopter with its relatively slower horizontal speed and greater capacity for lift-thrust effect.

Figure 17:
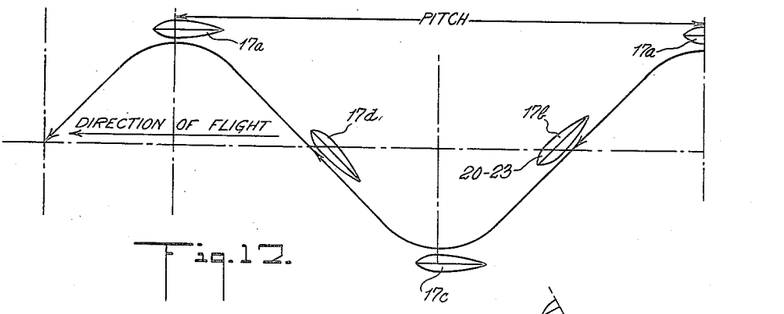

Referring to Fig. 17, there is shown the aerofoil change when the aeroplane has reached its full flight speed. As indicated in the several succeeding positions of the aerofoils, starting with the twelve o'clock horizontal position at 17a, the aerofoil is moved by the cam towards a fixed angle of declination on the descending side until it assumes the maximum tilted position shown in 17b, after which it gradually approaches again the horizontal position at the bottom of the cycle of movement indicated at 17c, and then, on the upstroke side it moves into the upwardly angled position shown at maximum tilt at 17d and back into the original upper horizontal position at 17a. It is thus seen that in the normal operation of the propeller with the aeroplane in flight a nicety of balance may be maintained between that part of the engine force which is utilized for supporting purposes and that utilized for propulsion. On both the ascending and descending movements the propeller is acting rearwardly on the body of air with a resulting reactory forward propulsion of the vehicle. In the upper and lower positions the aerofoils are in a substantially neutral position offering minimum resistance to the air flow.

Even while in flight and under control of the cam, it is obvious that any unusual air pressure which may occur for any reason on say one-half of any of the sets of aerofoils, and not on the other, would simply cause the affected part to shift and thus give to the abnormal air pressure; the spring 84 tending thereafter to restore the parts to their normal operative position when the unbalancing force has disappeared.

Figure 18:
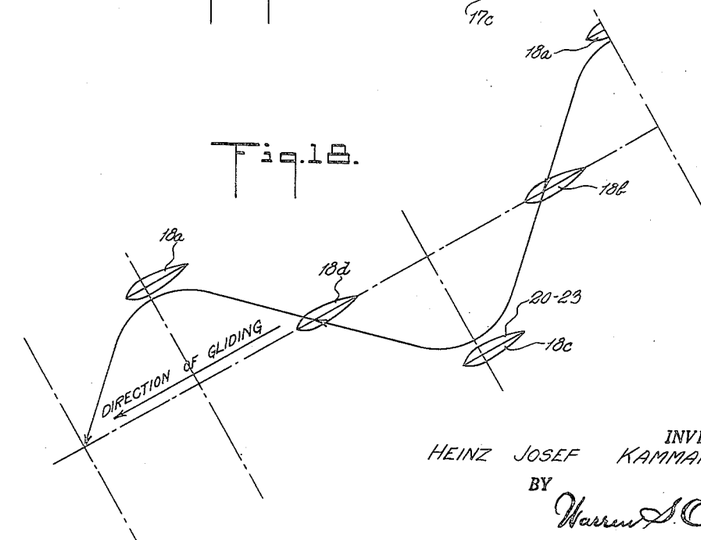

The propeller can also contribute to an easy descent of the aeroplane as when gliding and in this connection reference is made to Fig. 18 to show the disposition of the aerofoils in one pitch distance, that is the distance the aeroplane moves in one revolution of the propeller. With the engine throttled or shut off from positively rotating the propeller, the propeller speed would, of course, decrease and when lowered from the minimum speed at which the cam operates, the cam controlling springs will shift the cam into its initial inoperative position thus leaving the aerofoils under control solely of the resisting air pressures which they meet. The rack springs 60 and 61 will pull the aerofoils towards and almost into a position parallel to the downwardly inclined line of flight in which position they remain even though the propeller is rotating slowly, thus offering the least possible frontal resistance as indicated in Fig. 18. While the showing of the aerofoils at 18b and 18c seem to indicate that their axes h—i are in the line of flight, as a matter of fact the leading edge of 18b is actually a few degrees depressed and the leading edge of 18d is actually a few degrees elevated above the line of flight.

It is herein suggested that by means of a suitably designed cam surface 67 it is possible to cause the descending aerofoil as it approaches position 17b to have its leading edge less inclined thereby to get more lift than thrust and to cause the ascending aerofoil as it approaches the position 17d to move into that neutral angle at which it will be doing no work. This, of course, would necessitate a control cam having a roller engaging surface different from that shown at 67. However, this aspect of the present disclosure is referred to simply to show that cam 68 may be designed to obtain an angle on descent of the aerofoils different from the angle of the aerofoils on ascent.

Figure 20:
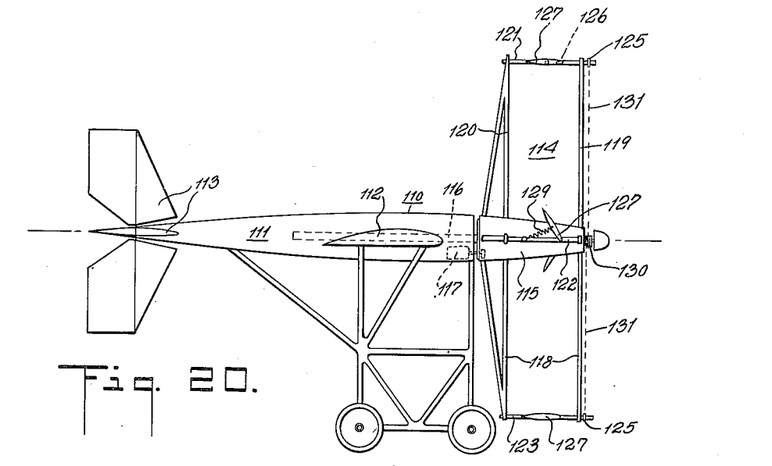
Figs. 20, 21 and 22 are respectively a view in side elevation, a view in plan and a view in front elevation of another and simpler form of the invention.
Figure 21:
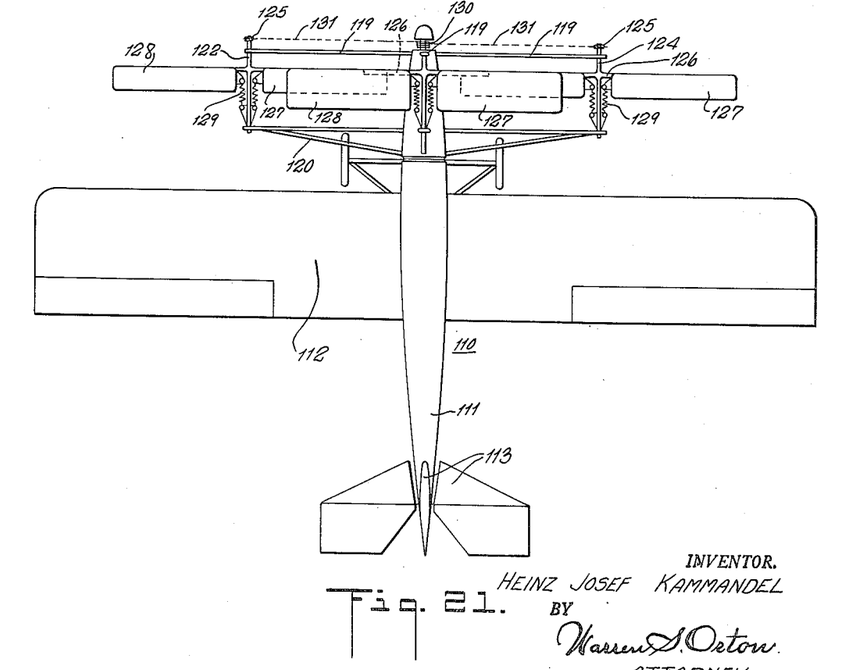
Figure 22:
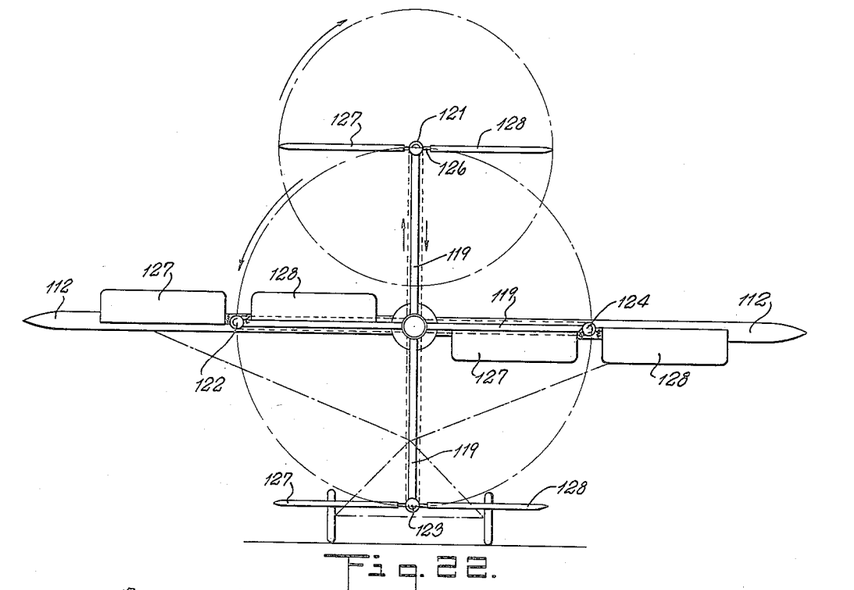

In the modified form of the invention disclosed in Figs. 20–22 the aeroplane is disposed with its propeller parts in that position which they would assume when in normal forward flight.

There is shown an aeroplane 110, including a fuselage, supporting planes 112, and guiding rudders 113. The aeroplane is provided at its forward end with a propeller 114 in general functioning as has been described for the propeller 14. The propeller 114 includes a hub forming head 115 mounted to turn on a fixed stub shaft 116 secured to and projecting forwardly from the fuselage. A motor 117 within the fuselage is geared to the hub to rotate the same and therethrough to rotate the propeller about the axis of the shaft 116.

The hub 115 carries a skeleton form of aerofoil supporting frame 118 formed of four forwardly disposed radial struts 119 disposed ninety degrees apart as shown in Fig. 22 and four rearwardly disposed radial struts 120. Journaled for rotary movement between the associated pairs of front and rear struts are four aerofoil shafts 121, 122, 123 and 124 extending horizontally and lengthwise of the direction of flight and each provided at its forward end with a driven sprocket 125. Each of the aerofoil shafts has secured thereto a cross arm 126 (see Fig. 21) extending transversely of the line of flight. A pair of aerofoils 127 and 128 are loosely journaled on each cross arm and are each normally maintained in horizontal position by a spring 129 corresponding functionally to the spring 84 (Fig. 13). The aerofoils are unbalanced relative to their axis of turn, it being noted that the major portion of each aerofoil is in rear of its associated axis provided by its cross arm 126.

Four sprockets 130, one for each of the four sprockets 125, is secured to the forward end of the fixed shaft 116 and thus are fixed relative to the fuselage. Four driving connections are provided, one for each aerofoil shaft, and arranged to rotate each aerofoil shaft once for each rotation of the frame 118. Each connection includes an endless flexible chain 131 looped about one of the driven sprockets and that one of the sprockets 120 in the plane thereof.

In operation and assuming that the head or hub 115 and with it the frame 118 is turning counterclockwise as indicated in Fig. 22, the several aerofoil shafts 121—123 will turn in space about the large circle in Fig. 22 in the direction indicated by the arrow thereon. Due to the interdriving relation between the several driven sprockets 125 revolving in space about the axis of the fixed shaft 116 and the fixed four-unit sprocket 130, the several aerofoils 127—128 will tend (ignoring air resistance) to remain horizontal in all positions and such normal disposition is shown in the case of the aerofoils at top and bottom of their orbit as shown in the several figures.

It is obvious, however, that in positions other than at the twelve and six o'clock positions, the aerofoils are moving more or less vertically against air resistance. Considering the situation at the left side of Fig. 22, where the aerofoil shaft 122 is descending, the rear trailing edges of both aerofoils are elevated as shown in Figs. 20–22 against the resistance of their associated springs.

Figure 19:
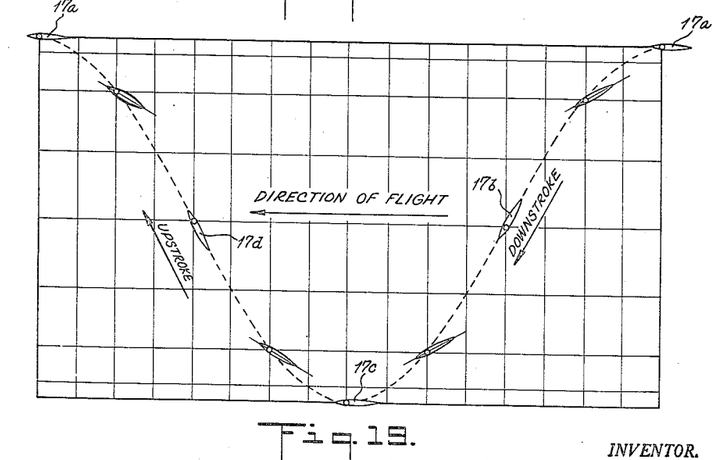
Fig. 19 is an explanatory view similar to Fig. 17, showing some additional intermediate positions of the aerofoils.

Now, considering the situation at the right side of Fig. 22, where shaft 124 is rising, the rear trailing edges of the associated aerofoils are depressed as shown slightly below the hub 115 in Fig. 20 and against the resistance of their associated springs. It will thus be seen that at the top and bottom of the cycle of movement of the frame 118 the several aerofoils will be horizontal at the twelve o'clock position as they are moving edgewise through the air; will reach the maximum degree of elevation as they pass their nine o'clock position; gradually approach and pass their horizontal disposition at their six o'clock position; then reach their maximum degree of downward tilt at their three o'clock position; and then back to their initial disposition horizontal at their twelve o'clock position as illustrated in Figs. 15, 17 and 19.

I claim:

1. An aeroplane propeller in the form of a cross with its axis of rotation at the center of the cross, each arm of the cross extending radially of the axis and provided at its outer end with a bracket, an auxiliary shaft journalled in the bracket and extending parallel to said axis, interconnected means for rotating the shaft as the propeller is rotated, a casing secured to and rotating with the shaft and maintained thereby in a horizontal position as it is revolved in space, an aerofoil shaft journalled in the casing and projecting from opposite sides thereof and extending at right angles to the auxiliary shaft, a pinion secured to the aerofoil shaft within the casing, a pair of racks slidably mounted in the casing, and in mesh with the pinion on opposite sides thereof, springs between the racks and casing tending to set the aerofoil shaft in a prefixed rotary position, a barrel type cam slidably mounted on the bracket and adapted to be moved into engagement with the racks and therethrough to rock the aerofoil shaft first in one direction and then in the opposite direction during a single rotation of the propeller, a centrifugal governor controlled by the speed of rotation of the propeller for moving the cam to and from its position engaging the racks, a pair of aerofoil forming blades carried by the projecting ends of the aerofoil shaft, springs between each blade and the aerofoil shaft tending to restrain rocking movement of the blades relative to the aerofoil shaft but permitting unequal air pressures on the upper and lower surfaces of the aerofoil to tilt the same relative to its normal horizontal position when free of such unbalancing air pressures.

2. An aeroplane propeller comprising a frame including a hub provided with means for mounting the propeller on a power shaft, four spokes extending radially from the hub and disposed in pairs 180 degrees apart to form a cross with the axis of rotation at the center of the cross, four aerofoils shafts, one for each of the spokes and extending in all positions at right angles to the axis of the propeller, four aerofoils, one carried by each of the aerofoils shafts and disposed with the shaft in advance of the loci of vertical air pressures on the aerofoil, rockable about the axis of its associated shaft and resilient means tending to secure the aerofoil to turn with its associated shaft, a planetary gear train including a central stationary gear concentric with the axis of the propeller and four driving connections, one carried by each spoke and each comprising a floating gear riding on the stationary gear, a pair of intergeared shafts extending at right angles to each other, with one shaft extending along a spoke and in driving relation with the associated floating gear and the other shaft extending horizontally and provided with a revolving and rotating casing in which the associated aerofoil shaft is journalled, and said driving connection tending to maintain the aerofoils horizontal in all their rotary positions and each aerofoil capable of being rocked by unbalanced air pressures on their upper and lower surfaces against the resistance of said resilient means.

3. An aeroplane including a power shaft extending in the longitudinal axis of the aeroplane and in its normal line of flight, a propeller comprising a hub mounted on the shaft and rotated thereby, four spokes extending radially from the hub to form a cross, rotatable in a plane perpendicular to said axis, mechanism for rotating all of the spokes in the same direction and including a planetary gear train including a fixed gear disposed concentric of said axis, and four driving connections, one for each spoke, each driving connection including a floating gear riding on the fixed gear, two intergeared shafts, one extending along its associated spoke and driven from its floating gear and the other of said intergeared shafts forming an auxiliary shaft extending horizontally and provided with a casing rotating about its own axis and revolving in space about the axis of the propeller, an aerofoil shaft journalled in the casing extending at right angles to said auxiliary shaft and disposed horizontally in all rotative positions of the propeller, four aerofoils, one carried by each of the aerofoil shafts, and normally rotating therewith relative to the casing, and control means between each spoke and its associated aerofoil for periodically rocking the shaft relative to the casing to cause the aerofoil to extend horizontally at the top and bottom of its cycle rotary movement to cause the leading edge to be depressed below the trailing edge during its descent and to cause the leading edge to be elevated above the trailing edge during its ascent.

4. In a construction for propelling an aeroplane horizontally, the combination of an aeroplane providing means forming a propeller axis disposed in the normal line of flight, a propeller mounted in said structure for rotary movement about the axis, and including a frame, four aerofoil rocking shafts supported from the frame for rotary movement about the axis in a plane at right angles to the propeller axis, said aerofoil rocking shafts disposed in pairs on diametrically opposite sides of the propeller axis and thus equidistantly spaced apart circumferentially, an aerofoil secured to each shaft to rotate therewith and mounted thereon for slight oscillatory movement about its own axis of oscillation, interconnecting means tending to shift each aerofoil into horizontal position at all points of its revolving movement about said propeller axis, the air pressure surfaces at top and bottom of each aerofoil being symmetric relative to its longitudinal axis and its axis of oscillation being disposed slightly in advance of the loci of the vertical pressures and said aerofoils each tending when approaching and receding from both of its limiting points of vertical movement in both directions to tilt with the advance edge depressed as the aerofoil descends and elevated as the aerofoil ascends, and springs tending to maintain the aerofoils in horizontal position as they approach and recede from their highest and lowest positions in their cycle of revolving movement, said springs being of insufficient tension to resist the air pressure acting on the aerofoils from oscillating the same during the ascending and descending periods of their revolving movements and capable of restoring the aerofoils to their horizontal positions when free of unbalancing air forces.

5. A propeller including a frame mounted for rotation about an axis, an auxiliary shaft mounted in the frame and extending parallel to the axis, interconnected means for rotating the shaft as the propeller rotates, a casing secured to and rotating with the shaft, an aerofoil shaft journalled in the casing, an aerofoil carried by the shaft and rotated thereby, a pinion secured to the aerofoil shaft, a pair of racks in mesh with the pinion on opposite sides thereof, and a cam slidably mounted on the frame and adapted to engage the racks to shift the same and thus rock the aerofoil shaft and its associated aerofoil.

6. In an aeroplane, the combination of a fuselage provided with a fixed stub shaft, a propeller mounted for rotary movement on the shaft, said propeller including a hub journaled on the shaft and a frame carried by the hub and rotating therewith, said frame including at least one pair of struts extending radially from the hub in balanced relation on opposite sides thereof, each strut provided adjacent its outer end with an aerofoil shaft extending lengthwise of the fuselage and revoluble in space about the normal line of flight of the aeroplane, each aerofoil shaft provided with a cross arm extending at right angles to the same, a pair of aerofoils, one for each aerifoil shaft and each rockably mounted on its associated cross arm, a pair of springs, one for each aerofoil connecting its associated aerofoil and frame and, each biased to maintain its associated aerofoil normally in a horizontal position in normal flight, and means controlled by the rotation of the frame for revolving the aerofoils to maintain the aerofoil shafts horizontal in all rotative positions of the frame, said means including for each aerofoil shaft a sprocket fixed to the same, a second sprocket fixed to the stub shaft and an endless chain drive connecting the two sprockets.

7. In an aeroplane power mechanism, the combination of an aerofoil mounted for cyclic movement over a closed orbital path with its center of pressure at all times in a substantially vertically extending plane at right angles to the line of flight, means for bodily revolving the aerofoil about its path, said aerofoil provided with opposing upper and lower air pressure or working surfaces each normally extending substantially at right angles to said first-named plane of movement and rockable about a horizontal axis parallel to said plane, said axis being closer to the leading than to the trailing edge of the aerofoil, and said aerofoil being thus operatively responsive to unbalanced air pressures on what for the moment is the advancing side, top or bottom side, of the aerofoil for rocking the aerofoil about said axis, and spring means between said revolving means and said rocking means biased for disposing the aerofoil normally to extend in a substantially horizontal position at the top and bottom of its cycle of movement to dispose the areofoil in position tilted at an angle to both the horizontal and vertical when in positions intermediate the top and bottom of the cycle, with the upper surface facing forwardly as the aerofoil is descending and with the upper side facing rearwardly as the aerofoil is ascending in its cyclic movement.

8. In an aeroplane propulsion mechanism, the combination of a frame mounted for rotation about its own axis, means for rotating the frame, an aerofoil carried by the frame in spaced relation to said axis and mounted for bodily cyclic movement with a vertical component in both an up and a down direction, said aerofoil mounted in the frame to have a rocking movement about a self-contained horizontal rocking axis disposed in advance of the center of pressure of the aerofoil and said rocking axis at all times disposed in a vertical plane extending at right angles to the first-named axis, and control means operably connected to the aerofoil to operate in synchronism with the bodily revolving movement of the aerofoil and moved by the reactionary air pressure acting on its lower surface as the aerofoil is descending to move the aerofoil about said rocking axis from a horizontally extending position at the upper limit of its bodily movement, through an inclined position to a horizontally extending position at the lower limit of its bodily movement, similarly as the aerofoil is ascending to move the same from its horizontal position at the lower limit of its bodily movement through an inclined position and back to the horizontal position at the upper limit, the rocking being in one direction from the horizontal during the descent and in the opposite direction during the ascent.

9. An aeroplane propulsion device comprising a relatively massive and thus rugged hub mounted for rotary movement about its axis of rotation in the line of flight of the aeroplane, said device comprising a plurality of relative large wing-like aerofoils spaced from the axis and from the hub to obtain a large fly-wheel effect and skeleton frame of relatively small mass and having relatively small areas facing forwardly of the device, thereby to minimize frontal air resistance in the parts connecting the aerofoils with the hub, said aerofoils being mounted for turning bodily in a plane at right angles to said axis and disposed with their centers of pressure moving in a closed circle in said plane, each aerofoil rockable about an axis adjacent and parallel to its leading edge, and spring means biased to resist the rocking and tending to maintain the aerofoils in a horizontal position as they revolve in space about the axis of rotation, and means for rocking the aerofoils in opposition to the resistance of said spring means.

10. An aeroplane propulsion device comprising a hub mounted for rotary movement about an axis of rotation, a plurality of aerofoils having materially greater length than width being symmetric relative to a mid-plane and having the same contour of air-beating surfaces at their upper and lower faces and forming a relatively large mass spaced from the axis to obtain a large flywheel effect and a skeleton frame of relatively small mass connecting the aerofoils with the hub, said aerofoils having their leading edges facing in the direction of flight and turning in a plane at right angles to said axis and their centers of pressure moving in a closed circle in said plane, and resilient means tending to maintain the aerofoils in a horizontal position when free of unbalancing air pressures on their bearing faces, said aerofoils having a length greater than the radius of said circle to provide maximum length while providing for clearance between the aerofoils and the hub during rotation.

11. A propeller mounted for rotary movement about an axis of rotation and including a long aerofoil normally disposed in a horizontal gliding position, revolved bodily in space in a plane perpendicular to said axis, said aerofoil being bow-shaped in vertical cross-section in the direction of flight with its opposing surfaces forming upper and lower air-beating work surfaces and having one of its long edges in advance in all positions thereof and facing in the direction of flight, and means operating in synchronism with the rotation of the propeller and connected to the aerofoil to cause said long advance edge to be tilted downward from the horizontal during its descent and tilted upward from the horizontal during its ascent, and spring means biased to oppose the tilting of the aerofoil in either direction from its horizontal gliding position.

12. A propeller mounted for rotary movement about an axis of rotation and including a long aerofoil revolving bodily in space in a plane perpendicular to said axis and said aerofoil also rockable about a rocking axis at all times contained in said plane, means tending to maintain the aerofoil in a horizontal position, said aerofoil having one of its long edges in advance in all positions thereof and facing in the direction of flight, means responsive to the rotary movement of the propeller for rocking the aerofoil about said rocking axis with said edge tilted downward from the horizontal during its descent and tilted upward from the horizontal during its ascent, resilient means tending to oppose the tilting of the aerofoil from its horizontal position, and mechanism including a governor controlled by the speed of rotation of the propeller and means controlled by the governor for positively moving the aerofoil to and from said tilted position independently of any tilting which may be caused by the reaction of the air on the currently advancing face of either the descending or ascending aerofoil.

13. An aeroplane propeller mounted for rotary movement about an axis of rotation, including a long rectangular aerofoil with its opposing upper and lower surfaces forming work surfaces, having its center of pressure revolvable in a normally vertical plane at right angles to the axis and to the line of flight of the aeroplane and having one long straight edge forming a leading edge at all times facing in the direction of flight, spring means tending to maintain the aerofoil in a horizontal position at all points in its cycle of rotary movement, said aerofoil capable of a slight freedom of rotary motion about a contained horizontal axis extending at right angles to said axis of rotation to assume an angle to the horizontal, and means acting on the aerofoil periodically to move it through the air and to rock it against the resistance of said spring means about said horizontal axis to dispose it momentarily with its advancing face inclined to the direction of bodily movement of the aerofoil.

14. An aerofoil revolvable in a space and mounted to have its center of pressure move about a circle, means tending to maintain the aerofoil in a horizontal position at all points in its rotary movement, said aerofoil having a limited freedom of rocking movement about a contained horizontal axis and thus adapted to assume a position tilted slightly relative to the horizontal, a normally inoperative cam for rocking the aerofoil, and a governor actuated by the speed of the aerofoil for moving the cam from its inoperative position into a functioning position.

15. A propeller including a frame mounted for rotation about an axis, a shaft mounted in the frame and extending parallel to the axis, interconnected means for rotating the shaft as the propeller rotates, a casing secured to and rotating with the shaft, an aerofoil shaft journaled in the casing, an aerofoil carried by the aerofoil shaft and rotated thereby, a pinion secured to the aerofoil shaft, a pair of racks in mesh with the pinion on opposite sides thereof for rocking the aerofoil shaft, means controlled by the speed of the frame for moving the racks and therethrough to shift the aerofoil shaft, and a pair of springs urging the racks in the direction to restore the racks and aerofoil shaft to a normal position.

16. A propeller including a frame mounted for rotation about an axis, an auxiliary shaft mounted in the frame and extending parallel to the axis, interconnected means for rotating the shaft as the propeller rotates, a casing secured to and rotating with the shaft, an aerofoil shaft journaled in the casing, an aerofoil carried by the shaft and rotated thereby, a pinion secured to the aerofoil shaft, a pair of racks in mesh with the pinion on opposite sides thereof, a cam slidably mounted on the frame and adapted to engage the racks to shift the same, and a centrifugally actuated governor operatively connected to the cam to shift the same into operative engagement with the racks when the propeller has reached a preset speed.

17. A propeller mounted for rotary movement about a horizontal axis and including an aerofoil revolvable therewith in a vertical plane perpendicular to the axis of rotation of the propeller, means for mounting the aerofoil to rock about a horizontal axis at right angles to the propeller axis, means tending to maintain the aerofoil in a horizontal position in all rotary positions of the same, and means connected to the aerofoil and controlled automatically when the speed of rotation of the propeller reaches a preset speed for causing the aerofoil to rock from a horizontal position at the top and bottom of its movement into a position inclined to the horizontal and to said vertical plane when the aerofoil is between said top and bottom positions.

18. An aeroplane propeller mounted for rotary movement about an axis of rotation extending horizontally in the direction of the line of flight and including a wing-like aerofoil revolvable bodily in space about said axis in a vertical plane perpendicular to said axis, the top and bottom surfaces of the aerofoil being substantially flat for the major portion of its air-engaging area, the greatest dimension of the aerofoil extending transversely of said axis and thus transversely of the line of flight, with its leading edge being substantially straight and at all times facing in the direction of flight, said aerofoil mounted for oscillation about an axis extending lengthwise thereof and thus at right angles to said axis of rotation of the propeller for varying its position relative to said plane, and camming means operable in synchronous relation to the rotation of the propeller for periodically varying the angle of the aerofoil relative to said plane.

19. An aeroplane propeller organized to establish a line of flight and including at least one long wing-like aerofoil normally disposed in a substantially horizontal position with equal air pressure surfaces at its top and bottom faces and with one long straight edge at all times facing in the direction of flight, means for revolving the aerofoil in a vertical plane and along a circular path which passes through the thickness dimension of the aerofoil, said aerofoil mounted to tilt about a self-contained rocking axis located closely adjacent to and parallel to said long leading edge, spring means tending to resist the rocking of the aerofoil in both up and down directions about said axis, and means for bodily moving the aerofoil up and down vertically thereby to cause first one and then the other of said faces to slap the air one for each complete revolution.

20. An aeroplane propeller, including a casing revolvable in space about the axis of the propeller in a plane perpendicular to said axis, an aerofoil shaft journaled in the casing and disposed horizontally in all positions of the propeller, an aerofoil of wing-like configuration mounted on the shaft for a rocking movement about the axis of the shaft, spring means biased to maintain the shaft and aerofoil in a preset relative position, means for rocking the aerofoil shaft, and a two-point cam operating in synchronism with the propeller rotation and acting on the said last-named means for rocking the shaft first in one direction and then in the opposite direction.

21. A propeller mounted to rotate about a normally horizontal axis in the line of flight and including a frame extending radially of the axis, an aerofoil carried by the frame revolvable bodily therewith in space and with its leading edge facing in the direction of flight and having similarly contoured upper and lower air-contacting surfaces, said aerofoil having a span materially greater than its chord, means for mounting the aerofoil in the frame to rock about an axis extending in the direction of the span of the aerofoil, said rocking axis normally extending horizontally and located nearer the leading than the trailing edge thus to provide less area in advance of the rocking axis than in the rear thereof, and two mutually independent controls for automatically tilting the aerofoil from its normal horizontal position about its rocking axis, one of said controls functioning by reason of the air engaged by the aerofoil reacting on the greater area in rear of the rocking axis compared to the lesser area in advance of the rocking axis, and the other control including mechanical means controlled by the speed of rotation of the propeller and operating on the aerofoil to tilt the same mechanically.

22. An aeroplane propeller including an aerofoil having a greater span than chord, provided on one side with an upwardly-facing air-beating surface and on the opposite side with a downwardly-facing air-beating surface, said surfaces being symmetrical, power means for bodily moving the aerofoil at one time with the upwardly-facing side in advance and at another time with the downwardly-facing side in advance, said aerofoil disposed at all times with its leading edge facing in the direction of flight, means for mounting the aerofoil to rock about a self-contained axis extending in the direction of the span of the aerofoil and located nearer its leading edge than its trailing edge to present a greater area on both sides in rear of said axis than in advance of the axis to engage or to be engaged by the air on which it beats, and control mechanism operating in synchronism with said bodily movable means to tilt the aerofoil about said axis.

23. An aeroplane propeller mounted for rotary movement about a horizontal axis disposed in the line of flight, including an aerofoil revolvable bodily in space about said axis and spaced therefrom, said aerofoil being disposed normally in a horizontal position gliding edgewise through the air and revolving bodily in a plane perpendicular to said line of flight, said aerofoil having an upper and a lower surface symmetrical with reference to a midplane therebetween and each surface capable of beating the air when moved in a direction substantially flatwise against the air, the leading edge of the aerofoil at all times facing in the direction of flight, means for mounting the aerofoil to permit it to rock about a self-contained axis, and said last-named axis disposed in a horizontal position in all positions of the aerofoil.

24. The propeller defined in claim 23 and in which the leading edge of the aerofoil is substantially straight and more blunt than the trailing edge, said aerofoil having its maximum vertical depth located slightly in advance of its rocking axis and reducing therefrom in depth forwardly and gradually to the leading edge and reducing therefrom in depth rearwardly and gradually towards the trailing edge, the upper and lower surfaces in the parts thereof in rear of said rocking axis being each substantially flat.

25. An aeroplane propeller mounted for rotary movement about a horizontal axis of rotation normally disposed in the line of flight, including an aerofoil shaft mounted to rotate bodily in space in a plane perpendicular to the axis of rotation of the propeller, a long, wing-like aerofoil rotatably mounted on the shaft, said aerofoil having a greater span than chord, having upper and lower work faces of identical contour, having a leading edge at all times facing in the direction of flight, said shaft located to extend lengthwise of the aerofoil and nearer its leading than its trailing edge, and a spring acting on the aerofoil in a tendency to fix it rotatively relative to the shaft when free of forces which tend to rotate it about the shaft.

HEINZ JOSEF KAMMANDEL.

REFERENCES CITED

The following references are of record in the file of this patent:

UNITED STATES PATENTS

| Number | Name | Date |
|---|---|---|
| 951,615 | Kincannon | Mar. 8, 1910 |
| 985,034 | Horne | Feb. 21, 1911 |
| 1,069,880 | Kasmar | Aug. 12, 1913 |
| 1,308,784 | Hoiland | July 8, 1919 |
| 1,487,872 | Manzel | Mar. 25, 1924 |
| 1,872,758 | Laskowitz | Aug. 23, 1932 |
| 1,876,634 | Desautels | Sept. 13, 1932 |
| 1,915,685 | Mattson | June 27, 1933 |
| 2,054,947 | Riddle | Sept. 22, 1936 |
| 2,143,024 | Nemeth | Jan. 10, 1939 |

FOREIGN PATENTS

| Number | Country | Date |
|---|---|---|
| 401,649 | France | Aug. 2, 1909 |
| 610,023 | Germany | Mar. 6, 1936 |